United States Patent [19]

Relin

[11] Patent Number: 5,502,658
[45] Date of Patent: Mar. 26, 1996

[54] SAMPLED-CONTINUOUS PROBABILITY METHOD OF VELOCITY MEASUREMENT OF THE OBJECT HAVING INFORMATIVELY-STRUCTURAL INHOMOGENEITY

[76] Inventor: Arkadi Relin, 12 Woodbridge Pl., Langhorne, Pa. 19053

[21] Appl. No.: 278,827

[22] Filed: Jul. 22, 1994

Related U.S. Application Data

[63] Continuation of Ser. No. 634,468, Dec. 27, 1990, abandoned.

[51] Int. Cl.$^6$ .................................................. G06F 17/00
[52] U.S. Cl. ........................................................... 364/565
[58] Field of Search ............................. 364/565, 560, 364/566, 559, 474.28, 554, 174, 167.01; 73/861.05, 861.06; 324/160, 163

[56] References Cited

U.S. PATENT DOCUMENTS

| | | | |
|---|---|---|---|
| 4,201,083 | 5/1980 | Kurita et al. | 324/160 X |
| 4,257,275 | 3/1981 | Kurita et al. | 73/861.06 |
| 4,364,114 | 12/1982 | Renzel et al. | 364/565 |
| 4,896,268 | 1/1990 | MacGugan | 364/566 X |
| 4,956,789 | 9/1990 | Hamada et al. | 364/565 X |

FOREIGN PATENT DOCUMENTS

| | | |
|---|---|---|
| 579382 | 3/1977 | U.S.S.R. |
| 606952 | 4/1978 | U.S.S.R. |
| 651092 | 8/1978 | U.S.S.R. |
| 1245663 | 9/1984 | U.S.S.R. |

*Primary Examiner*—Ellis B. Ramirez
*Attorney, Agent, or Firm*—Ilya Zborovsky

[57] ABSTRACT

A sampled-continuous probability method of velocity measurement of an object having informatively-structural inhomogeneity by periodical execution of a cycle of the measurement, with determination of time during which a selected local part of the object moves along the measuring base of zone of observation is proposed. Selection of the local part in the beginning of the measuring base and its subsequent determination at the end of the measuring base is performed with the use of an informative aggregate of selected informative signs of a dominant informative component of the inhomogeneity. In order to increase the accuracy and speed of the method, the beginning of each cycle of velocity measurement is performed in response to a special command formed after the beginning of a preceding cycle of the velocity measurement with a given interval of time of shifting of the cycles, but within the preceding cycle. In each cycle of the velocity measurement a total time of execution of last stages connected with the computation and saving of the measuring information is selected smaller than minimum possible working step of time quantization of the velocity to be measured. Probability estimates of various time characteristics of the dominant informative component are used to provide invariability of metrological characteristics of the method to changes of the velocity to be measured within a wide dynamic and frequency range.

3 Claims, 4 Drawing Sheets

SAMPLED-CONTINUOUS PROBABILITY METHOD OF VELOCITY MEASUREMENT OF THE OBJECT HAVING INFORMATIVELY-STRUCTURAL INHOMOGENEITY

This application is a continuation of patent application Ser. No. 07/634,468, filed on Dec. 27, 1990, (now abandoned).

The present invention belongs to the area of velocity measurement of a wide class of objects, having natural informatively-structural inhomogeneity while moving relatively to the area of observation.

Such objects involve for example:

1) different multicomponent streams (such as hydrotransport, pneumo-transport, gaseous, and chemical ones, melted down metals, free-flowing bulk materials, plazmeous streams with the metal filling, etc), and also chemically homogeneous streams with the hydrodynamics turbulent formations (disturbances, vortexes); streams with the inhomogeneity in density, optical, temperature and other characteristics structurally distributed along the direction of their motion;

2) different articles made with the natural or manmade materials (rolled metal, paper, films, plates, fibers—in the process of their manufacturing), moving parts of machines and objects having inhomogeneity in density, thickness, temperature, optic, magnetic and other parameters which are structurely and continuously spreaded along the direction of their motion.

In order to provide the effective sensing of the motion of such objects and its investigation it is necessary on some occasions to use practically inertialess methods (and devices based on them) for measurement of the velocity of their motion. The said condition is especially vital while solving the sensing problems of dynamics motion of high speed objects, pulsating streams, fast moving and short objects, etc. At the same time it is necessary to provide the possibility of receiving the information not only about the average velocity of the object, but also about velocity variations during the short period of observation.

There are correlation methods (and devices based on them) of measurement of velocity of the objects with the informatively-structural inhomogeneity continuously spreaded along the direction of their motion. For example, the U.S. Pat. Nos. 3,595,078 (Bek, 1971) and 4,201,083 (Kurita, 1980).

The said methods provide the measurement of velocity of such objects by determining the time spent by its local parts for motion in the limits of fixed measuring base, on the edges of which two identical (as to shape and area) sensing zones are located. In these zones the images of indicative field, which define the informatively-structural inhomogeneity of the object, are continuously extracted and memorized. In this case the determination of the time needed for passing the base is done by computation of the mutual correlative function of two random signals proportional to random changes of images of the indicative field in the first and second sensing zones, accordingly, along the motion of said object. This method, however requires:

—a lot of time for computation and search of the extremum of correlative function, which is done at cost of adjustable retardation of the time the first signal used for processing;

—extended enough of random signals, which can be received only with the availability of a large measurement base;

—high demands to the stationarity and frequency bound of signals used for processing.

Besides, the integrative (continuous) character of correlation methods makes almost impossible their usage for sensing of dynamics of motion of such objects with the required accuracy, treshold of sensitivity and high speed in velocity measurement.

There is also a sampled-continuous probability method (and devices based on it) for velocity measurement of said class of objects. See, for example, the inventions in the USSR: #579382 (A. B. Relin et al, 1977) #606952 (A. B. Relin et al, 1978), #651092 (A. B. Relin, 1979), and #1.245.663 (A. B. Relin et al, 1986).

The sampled-continuous probability (SCP) method of velocity measurement differs from the correlation methods by nature. This method features periodical sequence of cycles of velocity measurement comprising the determination of the time the selected local part of said object moves along the measuring base of the zone of observation.

The method consists of following:

—positioning a measuring base of known length ($L_{AB}$) of a zone of observation in parallel to the direction of motion of an object, and —dispositioning in said zone of observation in the direction of the motion of said object first and the second zones of sensing of inhomogeneity, said zones of sensing have identical shapes and areas, axes of symmetry of said zones of sensing cross the ends (A&B) of said measuring base and are located in parallel to each other respectively;

—selecting the dominant informative component of said informatively-structural inhomogeneity of the object in said sensing zones;

—selecting the local part of said object in the beginning of the current cycle of velocity measurement in said first sensing zone (A), and —determining in said local part the informative aggregate of chosen informative signs of said dominant informative component of said inhomogeneity, for example the instant value of said component and sign (+ or −) of its derivative, and —memorizing said informative aggregate of signs for identification of the "image" of said selected local part of said object, and simultaneously —starting the determining of time of moving of said local part along said measuring base ($L_{AB}$);

—selecting the local parts of said moving object in said second zone of sensing (B), said selecting is executed continuously, and —determining said informative aggregate of said chosen informative signs in said continuously selected local parts, and —comparing said memorized informative aggregate of said signs with said determined informative aggregates of said signs, said comparing is executed during the interval of the time of identification using said selected informative signs, said interval of time of identification is determined in consideration of a range of possible changes of said velocity during the given time of said measurements of said velocity; then —finishing said comparing, said finishing of said comparing is executed, either at the moment of coincidence of said compared said memorized informative aggregate of signs with one of said determined informative aggregate of signs, said coincidence takes place when said "image" of said selected local part is determined in said second sensing zone, or at the moment when said interval of time of identification ends while said coincidence of said compared aggregates does not take place;

—determining said time of motion of said local part along said measuring base at the moment of said comparing at said moment of said comparing of said aggregate of signs, and —computation said velocity of said object during said current cycle of measurement, said velocity is computated thru dividing of the known said length of said measuring base over said determined time of motion of said selected local part along said measuring base;

—erazing the value of the object velocity memorized from the last resultative cycle of velocity measurement, and —memorizing said computated value of object velocity in the end of current cycle of velocity measurement; or —saving said value of object velocity, memorized from the last resultative cycle of velocity measurement, said saving of said velocity value is executed when said comparison ends in said moment of termination of said interval of time of identification in the end of the current cycle of velocity measurement.

As it follows from the analysis of the SCP method (see, for example, A. B. Relin "The systems of automatic sensing of technological parametres of suction dredges" —Moscow, "Stroyizdat", 1985, pp. 55–70) the length of a measuring base ($L_{AB}$) is selected with the consideration of a given maximal tolerable error of measurement $\delta_{VC(max)}$ and a range of changes of said velocity, and while executing the necessary condition:

$$\bar{t}_{lmin}(P) \cdot V_{min} > L_{AB} < \bar{t}_{fmin}(P) \cdot V_{max} \cdot V_{min}/(V_{max} - V_{min}), \quad (1)$$

where:

$V_{min}$, $V_{max}$—respectively, minimal and maximal values of said given range of changes of said velocity, m/sec;

$\bar{t}_{lmin}(P)$—probability value of a minimum possible time of "life" of said "image" of said local part in a process of its motion along said zone of observation, said time of "life" is determined at the moment when the quantity of "deformation" of said signs of identification of "image" exceeds a treshold of sensitivity $\Delta X_o$ of the process of said determination of said signs of identification, sec;

$\bar{t}_{fmin}(P)$—probability value of a minimum possible time interval between two sequently placed said local parts of said object (along the direction of its motion), which have the identic said "images", sec;

P—given level of probability of said values $\bar{t}_{lmin}(P)$ and $\bar{t}_{fmin}(P)$ (for example, 0,95), which are determined as a result of statistic and probability investigations of evolve processes of said selected informative signs of said dominant component of said informatively-structural inhomogeneity of said object in a whole said range of changes of the velocity of the motion of said object.

After finishing of above current cycle of velocity measurement, the new following cycle of measurement starts. In this new following cycle of velocity measurement all operations listed above are executed similarly. The information about said informative signs which were memorized from said current cycle of measurement are erased in the end of a said cycle. The method provides the execution of a few tens of said cycles of measurement per second. Thus, the periodic, and practically continuous repetition of said cycles of velocity measurement makes possible to receive, with the help of the SCP method, more complete information about the motion dynamics of said objects while using substantially smaller zones of observation of said objects. This makes the usage of SCP method preferable in comparison with the similar possibilities of known correlation methods for solution of said measuring problems.

However, it has to be noticed that in the known SCP method the time quantization interval of the velocity to be measured, changes automatically in an inverse proportion to the velocity value. This feature of the SCP method is connected with the sequent periodic execution of velocity measurement cycles, the duration of which determines the quantity of said quantization interval. At the same time in most cases of motion of said objects their velocity can change simultaneously in a wide range and with different frequency. It is evident, that the usage of the SCP method of velocity measurement in the said case (with providing the tolerable error of restoration of a process of velocity changes) is possible only when the following condition is completed:

$$t_{cmax} < t_{qv(min)}, \quad (2)$$

where:

$t_{cmax}$—maximum possible time for execution of a cycle of velocity measurement (at the minimal value), sec;

$t_{qv(min)}$—required minimal time quantization interval of said velocity to be measured, which is determined with reference to the given tolerable error of restoration of the process of changes of said velocity $\delta_{Vp(max)}$ and maximum possible frequency of said change $f_{Vmax}$, sec.

The execution of said condition (while solving said problems of measurement) requires providing the small $t_{cmax}$. It is evident, that (under the given range of changes of the object velocity) the provision a small $t_{cmax}$ can be reached only thru minimizing of the length of the measuring base $L_{AB}$. At the same time investigations of metrologic possibilities of SCP method of measurement showed that its usage requires:

1) execution of conditions (1) and (2);

2) providing of the given tolerable error of measurement of velocity in said cycle $\delta_{Vc(max)}$;

3) providing of the given range of velocity measurement, with the reference to execution of additional condition of choice of the length of said measuring base:

$$V_{max} \cdot \bar{t}_{imax}^{(Vmax)}(P) < L_{AB} > V_{min} \cdot \bar{t}_{imax}^{(Vmin)}(P), \quad (3)$$

where:

$\bar{t}_{imax}^{(Vmax)}(P)$, $\bar{t}_{imax}^{(Vmin)}(P)$—probability values of maximal possible interval of time between two nearest consistently placed said local parts of said object (along the direction of its motion), having different said "images", said values are determined by using the results of statistic and probability investigations of distribution of small quantities of the derivative, respectively, $X'_{min}{}^{(Vmax)}(P)$ and $X'_{min}{}^{(Vmin)}(P)$ of said dominant informative component of said informatively-structural inhomogeneity, which are determined under the motion velocity of said object, respectively, $V_{max}$ and $V_{min}$ at the given level of the probability reliability P, and with reference to said treshold of sensitivity $\Delta X_o$ of the process of said determination of said signs for identification of the "image" of selected local part of said object, sec;

4) possibility (in some cases) to make said zone of observation taking in consideration the condition:

$$L_{AB} > B, \quad (4)$$

where:

B—maximal size of said sensing zone of the inhomogeneity of he object (along the direction of its motion), which is chosen in accordance with provision of the optimum (from possible) said probability of values and frequency characteristics of processes of changes of said selected dominant component of informatively-structural inhomogeneity of object, m.

The analysis, however, shows that in the most cases (while solving the problems of measurement of velocity motion of said class of objects) practically impossible to provide simultaneous comletion of the above conditions. This limits of the possibilities of efficient usage of the SCP method of velocity measurement in the cases of sensing of the dynamics of the motion of said class of objects, when said motion is characterized by the great dynamics range and by the wide frequency range of velocity change.

The aim of the present invention is the increase of accuracy and speed of measurements of SCP method of velocity measurement of the object with the informatively-structural inhomogeneity with provision of the invariance of said metrologic characteristics of method to the changes of said velocity in the magnitude dynamic and wide frequency ranges.

This aim is achieved by using new universal approach to the periodic fulfillment of said cycles of velocity measurement in the SCP method. Said approach provides the possibility to execute said cycles in turn sequentially, as well as sequentially—concurrently. This possibility is reached due to the fact that in said new similar cycle or velocity measurement of said object selecting of the local part of said object is executed after said selection of said local part of said object in said beginning of said current cycle of velocity measurement and over the given interval of time of the shift of the cycles $\Delta t_{cg}$, the value of which is chosen with the reference to satisfaction of conditions:

$$\bar{t}_{i_{max}}^{(V_{min})}(P) < \Delta t_{cg} > \bar{t}_{i_{max}}^{(V_{max})}(P) + L_{AB} \cdot \quad (5)$$

$$\frac{|+\alpha_{max}| \cdot \bar{t}_{i_{max}}^{(V_{max})}(P)}{V_{min} \cdot [V_{min} + |+\alpha_{max}| \cdot \bar{t}_{i_{max}}^{(V_{max})}(P)]}$$

and $$\Delta t_{cg} < t_{q_{v(min)}} - L_{AB} \cdot \frac{|-\alpha_{max}| \cdot t_{q_{v(min)}}}{V_{min} \cdot [V_{min} + |-\alpha_{max}| \cdot t_{q_{v(min)}}]}, \quad (6)$$

where:

$|+\alpha_{max}|, |-\alpha_{max}|$—absolute values of given maximal, respectively, positive and negative accelerations, which can arrive during the motion of said object, m/sec$^2$, $L_{AB}$—said length of said measuring base, which is chosen with respect to fulfillment of said conditions (1) and (3), m, while said operations:

determining of said time of motion of said selected local part along said measuring base, and computation of value of said velocity of object;

erasing the value of the object velocity memorized from the last resultative cycle of velocity measurement, and memorizing said computated value of object velocity; are executed sequentially in each said cycle of velocity measurement during the total time, chosen with the reference to fulfillment of the condition:

$$t_{\Sigma d,c,e,m} < \frac{V_{min} \cdot |+\alpha_{max}| \cdot \Delta t_{cg} - V_{min}^2 - |+\alpha_{max}| \cdot L_{AB}}{2 \cdot V_{min} \cdot |+\alpha_{max}|} + \quad (7)$$

$$\frac{\sqrt{(V_{min}^2 - V_{min} \cdot |+\alpha_{max}| \cdot \Delta t_{cg} + |+\alpha_{max}| \cdot L_{AB})^2 + 4 \cdot V_{min}^3 \cdot |+\alpha_{max}| \cdot \Delta t_{cg}}}{2 \cdot V_{min} \cdot |+\alpha_{max}|},$$

where:

$\Delta t_{cg}$—chosen value of said given interval of time of the shift of the cycles, sec.

DETAILED DESCRIPTION OF THE INVENTION

Figure 1:
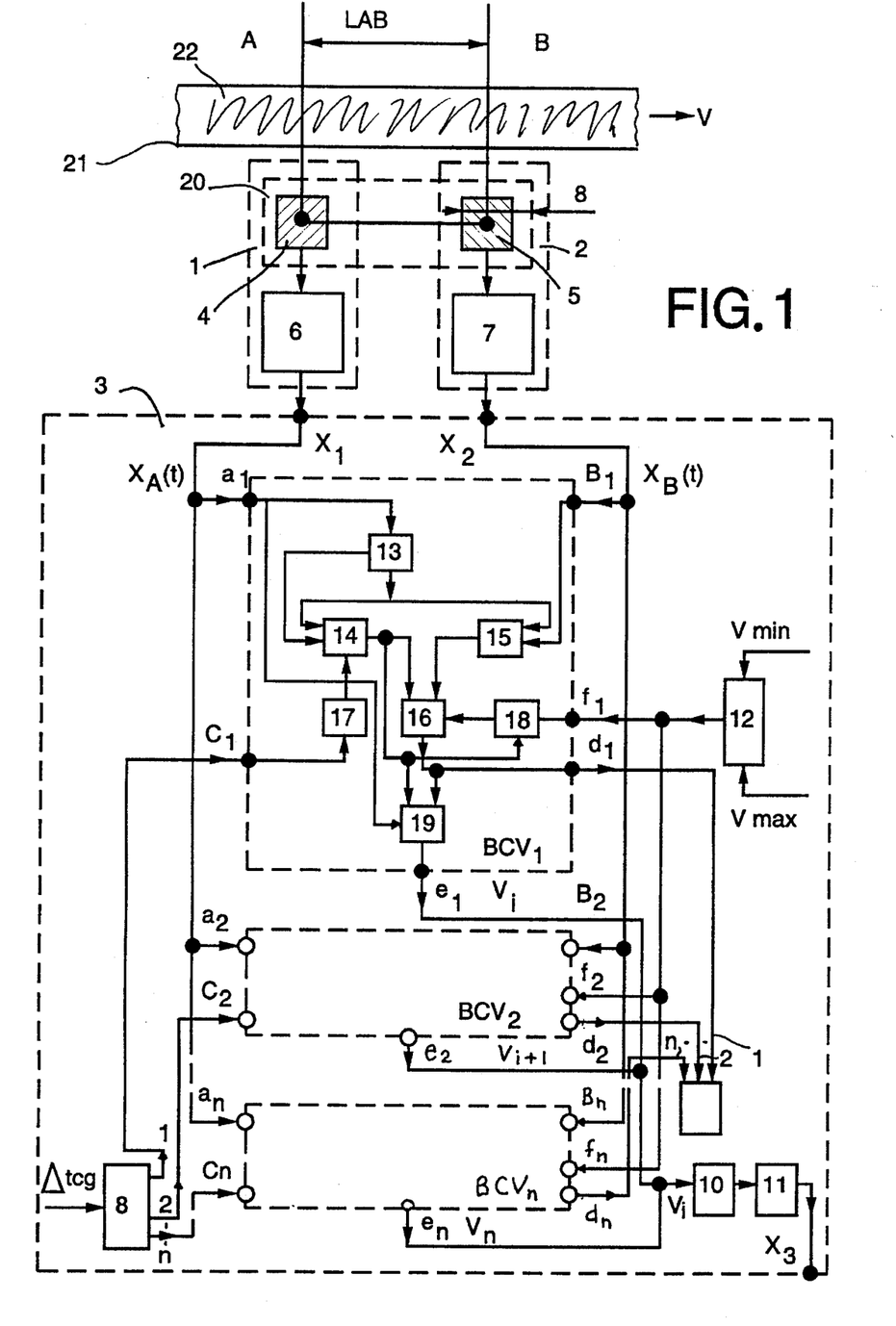
FIG. 1—example of functional block-diagram of measuring system, realizing the suggested SCP method of velocity measurement of the object having informatively-structural inhomogeneity (when $L_{AB} > B$).

On the FIG. 1 is given an example of functional block-diagram of a measuring system which realizes the suggested SCP method of measurement of object velocity with the informatively-structural inhomogeneity. Said system comprises two transducers 1 and 2, having identic constructive parameters and metrologic characteristics and also the device of information processing 3. The sensors 4 and 5 of said transducers have identic shape and area of working planes of sensing zones. Said sensors 4 and 5 are connected, respectively, to the inlets of conversion blocks 6 and 7 of said transducers. The outlets of said blocks 6 and 7 (i.e. the outlets of transducers, respectively, 1 and 2) are connected to the inlet X1 and X2 of said device of information processing 3. Said device comprises n equal blocks of velocity computation (BCV$_1$, BCV$_2$, ... , BCV$_n$), block of synchronizing 8, logical gate "or" 9, block of memory 10, filter 11, and set-point device of range (or its part) of possible change of velocity to be measured 12. Said block of velocity computation (for example, BCV$_1$) comprises: the element of memory of the main sign of identification 13, the element of determination and memorizing of additional sign of identification 14, the element of comparison of main signs and determination of additional sign 15, the element of comparison of additional signs of identification 16, the unit of control 17, the unit for deriving the interval of the time of identification 18, and computing unit 19. The inlet of said element 13 and second inlet of said element 14 are connected with the working inlet a$_1$ of said BCV$_1$, the second working inlet b$_1$ of which is connected to the second inlet of said element 15. The outlet of said element 13 is connected to the first inlets of said elements 14 and 15, the outlets of which are connected to the inlets of said element 16. The control inlets of said elements 13,14, and the unit 19 are connected to the outlet of said unit 17, the inlet of which is connected to the inlet of synchronizing of the beginning of the work $c_1$ of said $BCV_1$. The outlet of said element 14 is connected also to the first inlet of said unit 19 and to the control inlet of said unit 18. The outlet of the unit 18 is connected to the control inlet of said element 16, and the inlet of the unit 18 is connected to the defining inlet $f_1$ of said $BCV_1$. The outlet of said element 16 is connected to the second inlet of said unit 19 and to the outlet of control of memory block $d_1$ of said $BCV_1$. The outlet of said unit 19 is connected to the working outlet $e_1$ of said $BCV_1$. Said working inlets of said $BCV_1 \div BCV_n$ ($a_1 a_2, \ldots, a_n$) and ($b_1 b_2, \ldots, b_n$) are connected, respectively, to said inlets X1 and X2 of said device 3. Said inlets $c_1 \div c_n$ of the blocks of velocity computation are connected, respectively, to the outlets (1÷n) of said block 8, and said outlets $d_1 \div d_n$ are connected to respective inlets (1÷n) of said logical gate 9. The outlet of said element 9 is connected to the control inlet of said block of memory 10, to the inlet of which are connected working outlets $e_1 \div e_n$ of said blocs of velocity computation.

The outlet of said set-point device 12 is connected to said defining inlets $f_1 \div f_n$ of said $BCV_1 \div BCV_n$. The outlet of said block of memory 10 is connected to the inlet of said filter 11, the outlet of which is connected to the outlet X3 of device 3.

The suggested SCP method of object velocity measurement is realized under said measuring system in the following way.

First the positioning of said measuring base $L_{AB}$ of zone of observation 20 is executed in parallel to the direction of the motion of the object 21, having said informatively-structural inhomogeneity 22 (for example, optical). The length of said measuring base $L_{AB}$ is selected with reference to the given error of measurement and the range of velocity changes of said object 21, and under the fulfillment of said conditions (1) and (3).

Dispositioning said sensors 4 and 5 (i.e. the zones of sensing (A) and (B) of said inhomogeneity 22 of said object 21) is executed in said zone of observation 20. Axes of symmetry of said working planes of said elements cross the ends A and B of said measuring base $L_{AB}$ and are located in parallel to each other respectively.

Selecting the dominant informative component of said informatively-structural inhomogeneity 22 of the object 21 is made with the help of said transducers 1 and 2. Said selecting of said informative component takes place within said zones of sensing (A) and (B) of said inhomogeneity 22 through the sensing of it by said sensors 4 and 5, respectively, and the following convertion of information in said blocs 6 and 7. The occasional signals $X_A(t)$ and $X_B(t)$, which are proportional to said dominant component of said inhomogeneity, which is selected, respectively, in the first (A) and second (B) said zones of sensing (along the motion of object 21) enter the inlets X1 and X2 of said device of information processing. The optimization of frequency characteristics of the process of changes of said selected dominant component of said inhomogeneity of the object and said probability values $\bar{t}_{lmin}(P)$, $\bar{t}_{fmin}(P)$, $\bar{t}_{imax}^{(Vmax)}(P)$ and $\bar{t}_{imax}^{(Vmin)}(P)$ is reached through choosing the required sizes of said working planes of said sensors 4 and 5, and providing also in said blocks 6 and 7 of said transducers 1 and 2 of an optimum band of frequency spectrum filtration, respectively, of signals $X_A(t)$ and $X_B(t)$.

As it has been noticed before said longitudinal maximal size B of said sensing zone of inhomogeneity is of great important too. The example or realization of said zone of observation 20 when $L_{AB} > B$ is given on the FIG. 1.

Said block of velocity computation $BCV_1$ begins working after the signal enters its said inlet $C_1$ from the outlet 1 of said block of synchronizing 8. At that time, after the command, coming from said unit or control 17, the number of following operations are being executed simultaneously:

—selecting of local part of said object in said first zone of sensing A in the beginning of current cycle of velocity measurement, and —determination in said local part the informative aggregate of chosen informative signs of said dominant informative component $X_A(t)$, and —memorizing of said informative aggregate of said signs for identification of the "image" of said selected local part (in said elements of memory 13 and 14), and —starting the determining of time of moving of said local part along said measuring base $L_{AB}$ (in said computing unit 19). In this example the selection of said local part (i) executed in the moment, when the value of said component $X_A(t)$, (defining said local part), enters thru said working inlet $a_1$ of said $BCV_1$ the inlet of said element of memory 13, where said value of signal is being memorized at once (the main sign for the identification of "image" of selected local part). The sign of increment (+ or −) of said component $X_A(t)$, i.e. the additional sign for the identification of said "image", is determined and memorized in said element 14 at once after memorizing of said main sign in said element 13. The memorized information about said additional sign of identification (as a logical signal "+1" or "−1") is sent to the inlet of said element of comparison 16 from the outlet of said element 14 (for example, comparator). At the same time said logical signal enters the first inlet of said unit 19. At that moment in said unit 19 starts the determination of time during which said selected local part moves along said measuring base $L_{AB}$, when the command from said unit 17 at the inlet of control of said unit 19 is available. Said informative (the main and the additional) signs for identification of said selected local part of said object 21, memorized, respectively, in said elements 13 and 14, represent said informative aggregate of signs of said dominant informative component $X_A(t)$. The information about said informative aggregate of said signs for the identification of the "image" of said selected local part is sent to the first inlets of said elements of comparison of respective said signs (15 and 16). Then follows the execution of selecting the local parts of said object in said second zone of sensing B. Said selection is executed continuously by fixing of values of said component $X_B(t)$, entering through the working inlet $b_1$ $BCV_1$, the second inlet of said element 15. With the help of said elements 15, 16, and 18 two following said operations of velocity measurement method are executed:

determining said informative aggregates of chosen informative signs in said continuously selected local parts of said object 21, and comparing of said memorized informative aggregate of said signs with said being determined informative aggregates of said signs. Said values of said signal $X_B(t)$, entering the second inlet of said element 15, are the main being determined signs for identification of "images" continuously selected said local parts. Said values of signal $X_B(t)$ are continuously compared with those memorized in said element 13 value of signal $X_A(t)$. At the moment of coincidence of one of them with the memorized value of signal $X_A(t)$ in said element 15 (for example, comparator) the sign of increment (+ or −) of said signal $X_B(t)$ is determined. Simultaneously said sign of increment (+ or −), i.e. the additional sign for identification of said "image", is compared in said element 16 with memorized in said element 14 sign of increment (+ or −). Said comparison is being executed during said interval time of identification, which is derived at the outlet of said unit 18. The value of said interval of time of identification is defined at the inlet of said element 18 as the command comes from the outlet of said set-point device of range of possible change of velocity 12 to be measured. Said range of expected changes of velocity $V_{min}$–$V_{max}$ is setted by the operator at the inlets of said set-point device of range 12 before the beginning of measurement of said velocity of said object 21. The operation of said element 18 begins when signal, coming from the outlet of said element 14 enters its inlet of control and in the moment of beginning of said determination of said time of motion of said selected local part. When the additional sign of identification, determined in said element 15, coincides with the memorized similar sign in said element 14, at the outlet of said element of comparison 16 the command is generated. Said comma can be derived only during the period, when at said inlet of control of element 16 there is a command, which time of action is equal to said interval of time of identification. This condition provides the required immunity to interference of the process of said identification of said "image" of said selected local part of said object 21 during its motion along said zone of observation 20.

Thus, finishing said comparing (in this device) is executed at the moment of coincidence of those, being compared, said memorized informative aggregate of signs for identification of said "image" with one from said informative being determined aggregate of similar signs. Said coincidence takes place when said "image" of said selected local part (i) is in said second zone of sensing B, i.e., in the end of said measuring base $L_{AB}$. Besides that said finishing of said comparison can take place also at the moment of finishing of said interval of time of identification (when said coincidence of said being compared informative aggregates of said signs failures), i.e., when entering of said command coming from the outlet of said unit 18 to said inlet of control of said element 16 stops.

Said command coming from the outlet of said element of comparison 16 enters said second inlet of said computing unit 19 and inlet 1 of said logical element 9 (through said outlet of control of block of memory $d_1$ of said $BCV_1$). Under said command the following operations are executed:

determining said time of moving $t_{Mi}$ of said local part along said measuring base $L_{AB}$, and computation of value of said velocity $V_i$ of said object 21 in said current cycle of measurement:

$$V_i = \frac{L_{AB}}{t_{Mi}}, \text{m/sec},\qquad(8)$$

in said computing unit 19.

The signal, proportional to the computated value of velocity $V_i$ is sent from the outlet of said unit 19 to the inlet of said block of memory 10 (through said outlet $e_1$ of said $BCV_1$). Erazing of value of object velocity $V_{i-1}$, memorized from the previous resultative cycle of velocity measurement, and memorizing of said computated value of object velocity $V_i$ are executed in said block 10 as the command from said element 9 enters said inlet of control of said block 10. After execution of said operations the entering of said signal from the outlet of said unit 19 and said command from the outlet of said element 16 stop. It is reached, for example, with the help of circuit solutions providing the time retardation of erazing the output information in said element 16 and unit 19. (for the stated time $t_{\Sigma d,c,e,m}$ after the moment of generation of said command in said element 16).

When said command from the outlet of said unit 18 stops to enter the inlet of control of said element 16 (after termination of said interval of time of identification), the said element 16 loses the ability to produce command. At that time said information does not enter the inlets of said element 9 and block of memory 10. In said block 10 is provided saving of said value of object velocity $V_{i-1}$, memorized from the previous resultative cycle of velocity measurement. In the end of current cycle of measurement the information about the velocity ($V_i$ or $V_{i-1}$) coming from the outlet of said block of memory 10 enters the outlet $X_3$ of said device 3 through said filter 11.

Fulfilling of new similar cycle of velocity measurement of said object begins after the command coming from the outlet 2 of said block of synchronizing 8 enters the said inlet $c_2$ of said block of velocity computation $BCV_2$. Said command coming from the outlet 2 of said block 8 is derived over said given interval of time of shift of cycles $\Delta t_{cg}$ after said command from the outlet 1 of the block 8 enters said inlet $c_1$ $BCV_1$. In said new cycle of velocity measurement selecting of local part (i+1) of said object 21 is executed after said selecting of said local part (i) of said object in said beginning of current cycle of velocity measurement and over given interval of time of shift of cycles $\Delta t_{cg}$, the value of which was chosen with reference to fulfillment of said conditions (5) and (6). In said new cycle of velocity measurement all said operations are executed sequentially in said $BCV_2$. Said information $X_A(t)$ and $X_B(t)$ entering respective working inlets $a_2$ and $b_2$ of said $BCV_2$ is used similarly. In the computing unit of said $BCV_2$ are executed determination of time of motion $t_{Mi+1}$ of said local part (i+1) along $L_{AB}$ and computation of value of velocity $V_{i+1}$. Erazing of said value of velocity $V_i$ and memorizing of said velocity $V_{i+1}$, which enters the inlet of block 10 from the outlet $e_2$ of said $BCV_2$ are executed after the respective command from the outlet $d_2$ of said $BCV_2$ in said block of memory 10. If the "image" of said selected local part (i+1) cannot be detected during said interval of time of identification, in said block 10 is provided saving of said value of velocity $V_i$. Then, the information about the velocity enters the outlet $X_3$ of said device 3 from said block of memory 10, through said filter 11 ($V_{i+1}$ or $V_i$).

As the analysis showed, the provision of reliable time sharing of terminations of two nearest said cycles of velocity measurement (while choosing the total time for execution of said operations: determination of said time of motion $t_{Mi+1}$, computation of said value $V_{i+1}$, erazing of said value $V_i$, memorizing of said value $V_{i+1}$) requires the fulfillment of the condition:

$$t_{\Sigma d,c,e,m} < t_{qv(min)}^{(w)},\qquad(9)$$

where:

$t_{qv(min)}^{(w)}$—minimal possible working time quantization interval of velocity to be measured, which is determined by the right part of said condition (7), sec.

Said expression for the determination of $t_{qv(min)}^{(w)}$ is obtained while solving the quadratic equation, composed from the condition:

$$t_{qv(min)}^{(w)} = \Delta t_{cg} - \Delta t_{max}, \qquad (10)$$

where:

$\Delta t_{max}$—maximal possible decrease of said time, for example, $t_{Mi+1}$ (determined in a new cycle of velocity measurement) relatively $t_{Mi}$ (determined in a previous cycle of velocity measurement), said $\Delta t_{max}$ is determined from the expression:

$$\Delta t_{max} = L_{AB} \cdot \frac{1 + \alpha_{max} \cdot t_{q_v(min)}^{(W)}}{V_{min} \cdot [V_{min} + 1 + \alpha_{max} \cdot t_{q_v(min)}^{(W)}]}, \qquad (11)$$

which is derived for the situation, when $V_i = V_{min}$, and $V_{i+1}$ is measured under the characteristic tumax during the time $t_{qv(min)}^{(w)}$.

Then, said block of synchronizing 8 derives on its outlets (3÷n) similar said commands over said given interval of time of shift of cycles $\Delta t_{cg}$. Said commands provide the beginning of work of said blocks of velocity measurement ($BCV_3 \div BCV_n$) over said interval of time $\Delta t_{cg}$ by turns.

The number of said blocks above are chosen with reference to fulfillment of condition:

$$n > \frac{t_{c_{max}}}{\Delta t_{cg}} \qquad (12)$$

Figure 2:
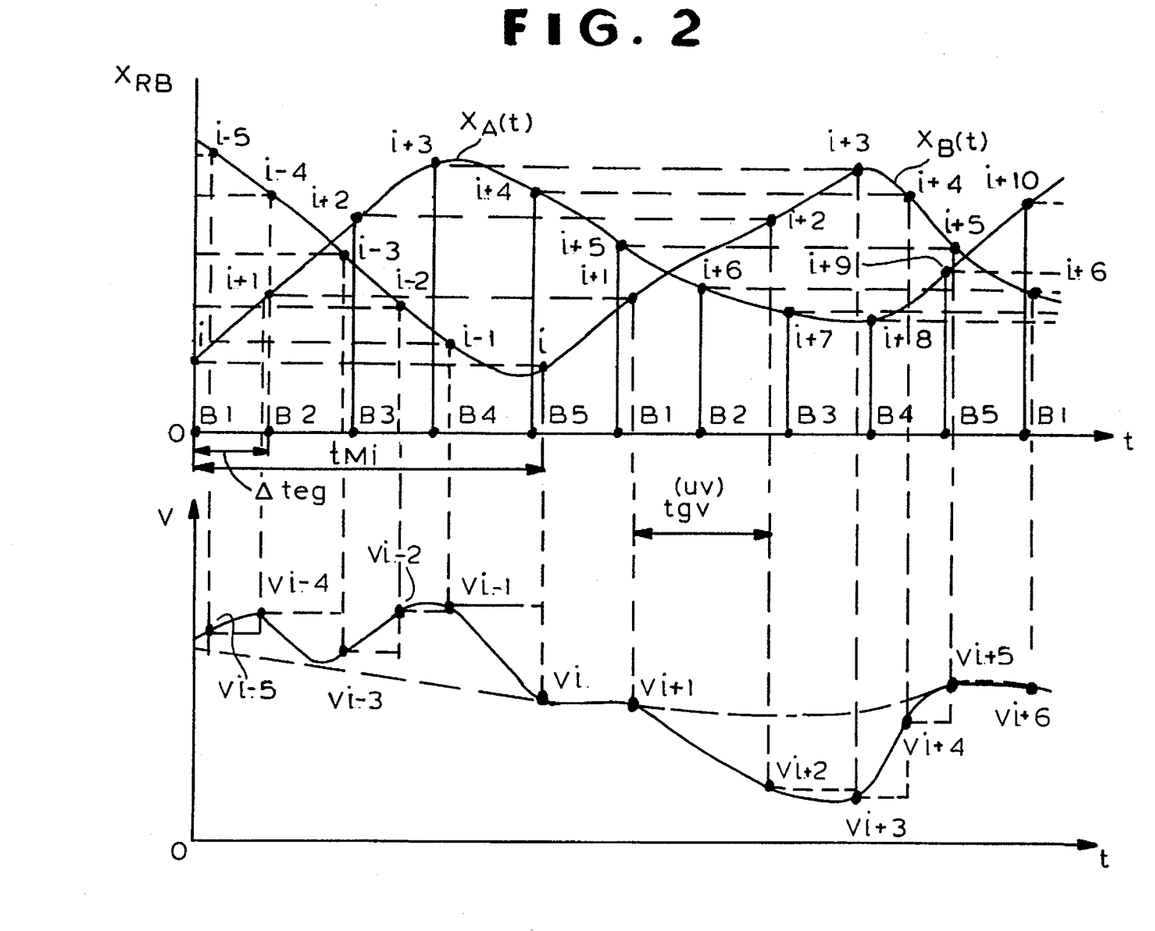
FIG. 2—examples of: sequentially—concurrent (when n=5) execution of cycles of velocity measurement of the object while using the developed SCP method of measurement (solid line on the graph of velocity), and sequential execution of cycles of velocity measurement of the object while using the known SCP method of measurement (dotted line on the graph of velocity).

The fulfillment of said condition (12) gives the possibility to provide the minimum necessary quantity of said blocks of velocity computation in said device of processing the information 3. When the respective commands are coming from the outlets (1,2, . . . ,n,1,2, . . . n,) of said block 8, the starting of said blocks ($BCV_1,BCV_2, \ldots , BCV_n,BCV_1,BCV_2, \ldots ,BCV_n, \ldots$) is realized sequentially and by turns. In the process of work of said blocks at the outlet of said block of memory 10 the value of velocity, computated in each cycle of measurement, is being fixed. At the outlet of said filter 11 the signal, proportional to the process of change of said velocity of said object is derived (see FIG. 2). The error of velocity measurement in the cycle does not exceed $\delta_{vc(max)}$, and the error of restoration of the process of change of said velocity does not exceed $\delta_{vp(max)}$.

It can be reached by usage the SCP method of velocity measurement which enables fulfilling the cycles of measurement sequentially and sequentially—concurrently as well. This approach enables to choose the length of said measuring base $L_{AB}$ only with reference to said conditions (1) and (3), without taking into consideration the limits, following said condition (2). Said condition (1) determines the upper bound, and said condition (3) determines the lower bound, while choosing $L_{AB}$ (under the given range of possible change of object velocity). Said condition (3) is derived with reference to necessity of providing the minimum possible time for execution of cycle of velocity measurement (when $V = V_{min}$, and when $V = V_{max}$) with reference, respectively, to said probability values $\bar{t}_{imax}^{(Vmax)}(P)$ and $\bar{t}_{imax}^{(Vmax)}(P)$.

Besides that, the choice of given interval of time of shift of cycles $\Delta t_{cg}$, with reference to said conditions (5) and (6), provides the working time quantization interval of velocity:

$$t_{qv}^{(w)} < t_{qv(min)}. \qquad (13)$$

Figure 3:
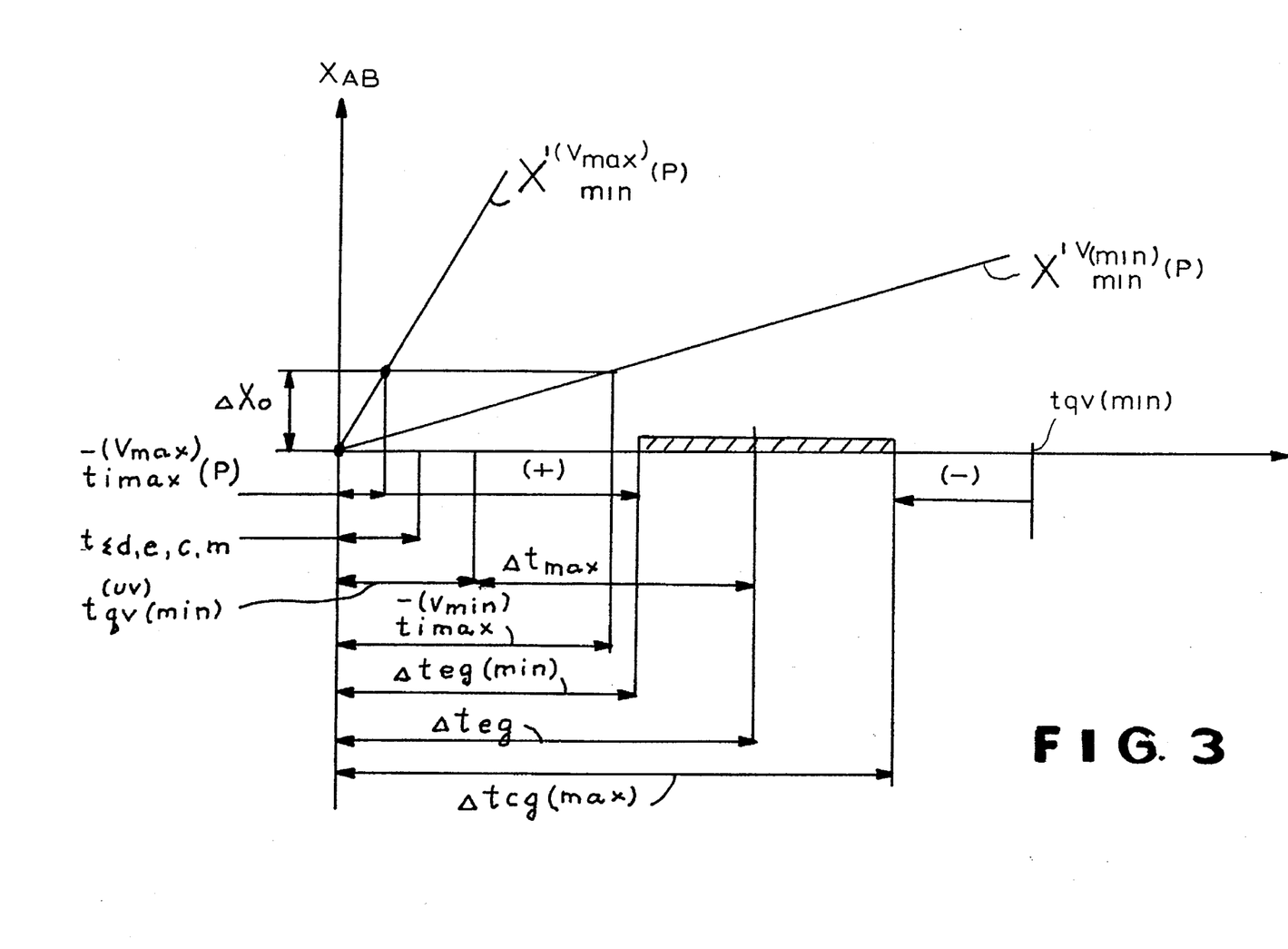
FIG. 3—illustration to the determination of temporal characteristics, used in conditions (3), (5)÷(7) and (9)÷(11).

It is reached in the way, when the upper bound $\Delta t_{cg(max)}$, while choosing $\Delta t_{cg}$, (the condition (6)) is determined for the situation, when the velocity is decreasing to the utmost (in the next cycle of measurement) from $V_i$ till $V_{i+1} = V_{min}$ under the action of given acceleration $-\alpha_{max}$ during said time $t_{qv(min)}$. The lower bound $\Delta t_{cg(min)}$, while choosing $\Delta t_{cg}$, (condition (5)) is determined with the reference to necessity of providing (see FIG. 3):

—the possibility of reliable selection of local part of said object in the beginning of the next cycle of measurement (left part of condition (5)), and —reliable identification of said selected local part in the end of said next cycle of measurement (the greater part of condition (5): left or right).

The right part of said condition (5) is determined for the situation, when the velocity is increasing to the outmost (in the next cycle of measurement) under the action of given acceleration $+\alpha_{max}$ from $V_i = V_{min}$ to $V_{i+1}$ during said time $\bar{t}_{imax}^{(Vmax)}(P)$. While deriving said conditions (5), (6) and (7) said situations are considered in the lower part of range of possible changes of said object velocity ($V_{min}$). It is explained by maximal absolute possible changes $t_M$ in said part of said range of velocity changes when said time $t_M$ in cycle of measurement has large magnitudes. The used said attitude enabled to derive said conditions, the fulfillment of which provides the required reliability in realization of suggested SCP method of measurement.

It has to be noticed that said working time guantization interval of velocity:

$$t_{qv}^{(w)} = \Delta t_{cg} \qquad (14)$$

(in steady regimes and under any values of velocity in limits of given range of its possible changes). Said working guantization interval can change in limits:

$$t_{qv(min)}^{(w)} \leq t_{qv}^{(w)} < t_{qv(min)} \qquad (15)$$

(only in transitional regimes of process of changes of velocity of said object). Said possibilities of digitization of information about measured velocity of said objects are the result of new universal attitude to forming of the process of velocity measurement in suggested SCP method of measurement. They provide the achievement of quantitatively new metrologic possibilities (the increase of accuracy and high speed) of said process of measurement of object velocity, which are invariant to changes of said velocity in magnitude dynamic and wide frequency ranges.

Said conditions (1), (3), (5), (6),and (7), used in suggested SCP method connect the number of given, determined and chosen parameters:

a) $V_{min}$, $V_{max}$, $+\alpha_{max}$, $-\alpha_{max}$, $f_{vmax}$, $\delta_{vc(max)}$, $\delta_{vp(max)}$ and $t_{qv(min)}$, (which provide the account of all requirements, imposed to the process of measurement of velocity of said object);

b) $L_{AB}$, $\Delta X_o$, $\bar{t}_{imax}^{(Vmax)}(P) = f[X'_{min}^{(Vmax)}(P), \Delta X_o]$, $\bar{t}_{imax}^{(Vmin)}(P) = f[X'_{min}^{(Vmin)}(P), \Delta X_o]$, $\bar{t}_{lmin}(P)$, $\bar{t}_{fmin}(P)$ and P (which provide possibility of determination of required optimal structural parameters, metrological and amplitude-frequency characteristics of transducers, used in a measurement system, which realize the suggested SCP method of velocity measurement of the object with the informatively-structural inhomogeneity);

c) $\Delta t_{cg}$ and $t_{\Sigma d,c,e,m}$ (which provide possibility of choice of both the optimal structural solutions, for example, the quantity of said blocks of velocity computation n, and temporal parameters of action of all elements, units and blocks of said device of information processing 3 of said measurement system).

Said completeness of developed theoretical foundations of suggested SCP method of velocity measurement gives wide possibilities in creation of a whole class of measurement systems (devices) for receiving the information about the dynamics of motion of said objects with informative-structural inhomogeneity. The compactness and reliability of such measurement devices (systems) is easily provided by usage up-to-date high speed microprocess components. Said measuring devices (systems) can execute per second practically any ($10^2$–$10^6$) number of cycles of measurement of the object velocity. Said possibilities of similar devices (systems) makes them preferable to all known devices of similar purpose.

The kind of informatively-structural inhomogeneity of particular object (chosen by the developer, while creating device for measurement of its velocity) defines the type of transducer, used for selection of said dominant informative component of said inhomogeneity.

Figure 4:
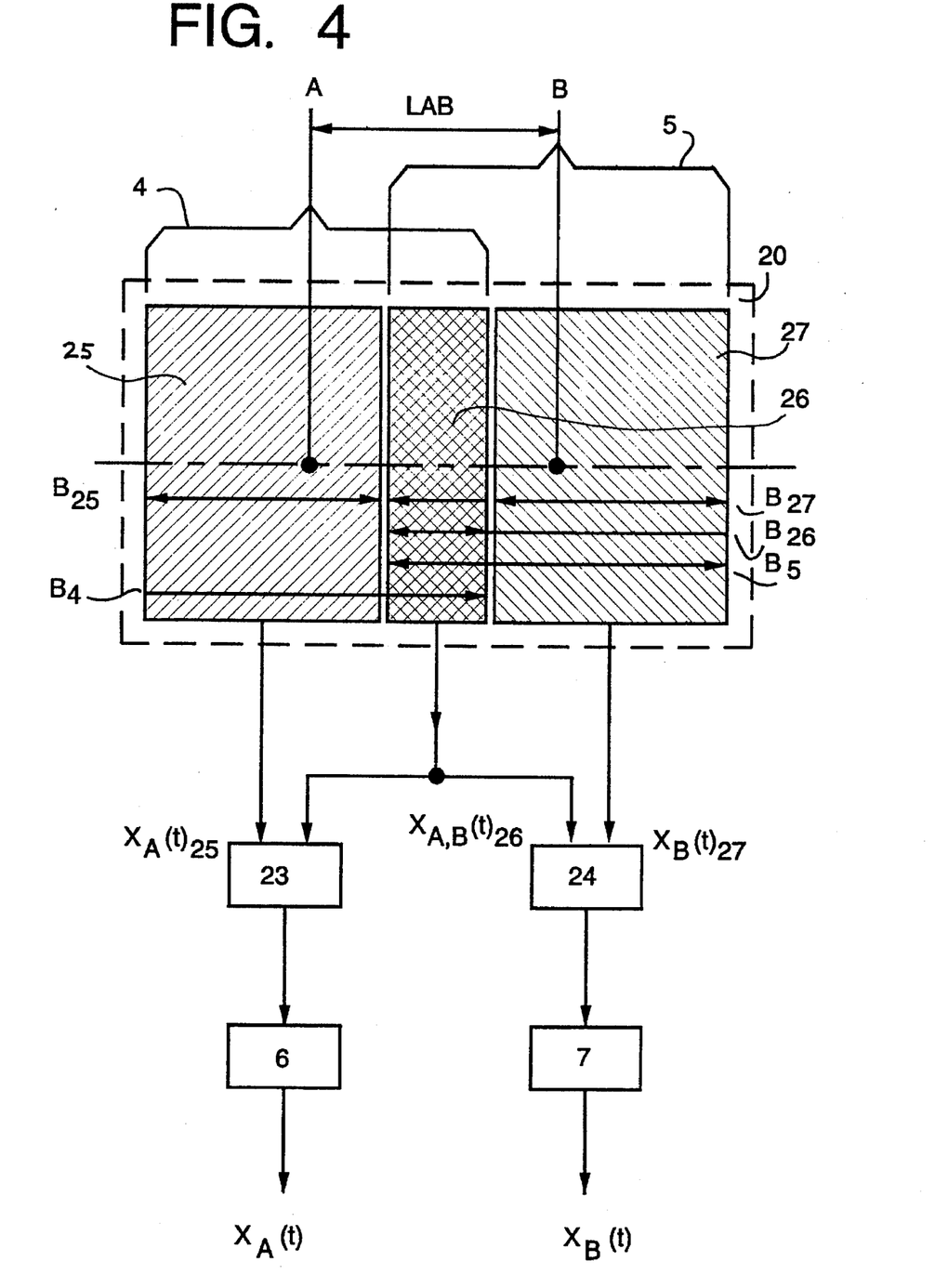
FIG. 4—example of possible realization of zone of observation of measuring system, realizing the suggested SCP method of velocity measurement of the object having informatively-structural inhomogeneity (when $L_{AB} < B$).

In given example of realization of suggested SCP method of measurement (FIG. 1) said maximal longitudinal size of said sensors 4 and 5 of said transducers 1 and 2 $B<L_{AB}$. However, when the required said sizes of B and $L_{AB}$ (which provide the possibility of realization of measurement system of suggested SCP method of measurement) are being determined, the necessity (in number of cases) of structural realization of said zone of observation 20 can appear, under the condition, when $B>L_{AB}$. In that case is suggested to use the circuit solution with usage of splitted working planes of said sensors 4 and 5 (FIG. 4). In said solution maximal longitudinal sizes of said sensors are, respectively, equal:

$$B_4=B_{25}+B_{26}>L_{AB},$$

$$B_5=B_{27}+B_{26}>L_{AB},$$

and $$B_{25}=B_{27}=L_{AB},$$

$$B_{26}=B_{4(5)}-L_{AB}.$$

Said parts of said working planes (25, 26, and 27) are located along said zone of observation 20 and structurally isolated between themselves. Besides that, their outlets are isolated electrically between themselves. The signal from the part 25 $X_A(t)_{25}$ enters the first inlet of summator 23, and a signal from the part 27 $X_B(t)_{27}$ enters the first inlet of summator 24. The signal from the part 26 $X_{A,B}(t)_{26}$ enters the second inlets of said summators. The summation of said signals and conversion in said blocks 6 and 7 provide continuous reception of required signals $X_A(t)$ and $X_B(t)$, which enter said block of information processing 3 (FIG. 1) for computation of velocity of said object 21.

The shape and area of splitted working planes of said sensors 4 and 5 are to be similar.

Thus, the developed SCP method of measurement (by usage of said attitudes for its realization) gives quantitatively new possibilities for creation up-to-date small-sized measuring devices (systems) for velocity measurement (and also accelerations and extents) of objects with informatively-structural inhomogeneity.

I claim:

1. A sampled-continuous probability method of velocity measurements of an object having informatively-structural inhomogeneity by periodic execution of a cycle of said velocity measurement with determination of time during which a selected local part of the object moves along a measuring base of a zone of observation, the method comprising the steps of:

before beginning of an execution of said cycles of velocity measurement:
—positioning said measuring base of said zone of observation parallel to the direction of motion of the object,
—dispositioning in said zone of observation in direction of motion of the object first and second zones of sensing said inhomogeneity,
—selecting a dominant informative component of said informatively-structural inhomogeneity of the object in said sensing zones;

in each of said cycles of velocity measurement:
—selecting a local part of the object in said first zone of sensing in the beginning of a respective cycle of velocity measurement,
—determining in said local part an informative aggregate of chosen informative signs of the dominant informative component of said inhomogeneity,
—memorizing said informative aggregate signs for identification of an image of said selected local part of said object, simultaneously,
—starting determining a time of moving said local part along said measuring base of a known length,
—continuously selecting local parts of said object in said second zone of sensing,
—determining said informative aggregate of said chosen informative signs in said continuously selected local parts,
—comparing said memorized informative aggregate of said signs with said determined informative aggregates of said signs during an interval of time of identification,
—determining said time of motion of said local part of the object along said measuring base at a moment of coincidence of the compared aggregates of said signs,
—computing a velocity of said object,
—erasing a value of the velocity of the object memorized in a preceding cycle of the velocity measurement,
—memorizing said computed value of the velocity of the object at the end of the current cycle of velocity measurement or instead of said memorizing,
—saving said value of the velocity of the object, memorized from a last cycle of velocity measurement, when said coincidence is absent at the moment of finishing of said interval of time of identification;

beginning of each cycle of velocity measurement on a command formed after beginning of a preceding cycle of velocity measurement after a given interval of time of shifting of the cycle but within the preceding cycle;

in each cycle of velocity measurement selecting a total time of execution of last stages including determining, computing, erasing and memorizing, smaller than minimum possible working step of time quantization of velocity to be measured, so that each cycle of the velocity measurements begins within a preceding cycle of the same.

2. A method as defined in claim 1; and further comprising the step of selecting said zones so that they have identical shapes and areas and their axes of symmetry intersect ends of said measuring base and are parallel to one another.

3. In a sampled-continuous probability method of velocity measurements of an object having informatively-structural inhomogeneity by periodic execution of cycles of said velocity measurement with each of the cycles including selecting in a beginning of a cycle a local part of an object in a beginning of a measuring base by determining and memorizing of an informative aggregate of chosen informative signs of a dominant informative component of the inhomogeneity of the object, determining a time of motion of the selected local part of the object along the measuring base between a time of the selecting of the local part and a time of passing of the selected local part over an end of the measurement base determined by a coincidence of the memorized informative signs with an analogous aggregate of informative signs of the object which after the beginning of the cycle are continuously determined at the end of the measurement base, and determining an object velocity from the end of motion of the local part from the moment of its selection to the moment of its passage through the end of the measurement base and a length of the measurement base, the improvement comprising beginning each subsequent one of said cycles of the velocity measurements within a preceding one of said cycles of the velocity measurements.

* * * * *